United States Patent
Krasner et al.

(10) Patent No.: US 10,860,236 B2
(45) Date of Patent: Dec. 8, 2020

(54) METHOD AND SYSTEM FOR PROACTIVE DATA MIGRATION ACROSS TIERED STORAGE

(71) Applicant: EMC IP Holding Company LLC, Hopkinton, MA (US)

(72) Inventors: Jonathan I. Krasner, Coventry, RI (US); Jason Jerome Duquette, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/403,344

(22) Filed: May 3, 2019

(65) Prior Publication Data
US 2020/0348875 A1    Nov. 5, 2020

(51) Int. Cl.
*G06F 13/00* (2006.01)
*G06F 3/06* (2006.01)
*G06N 3/08* (2006.01)
*G06N 20/00* (2019.01)

(52) U.S. Cl.
CPC .......... *G06F 3/0647* (2013.01); *G06F 3/0604* (2013.01); *G06F 3/0659* (2013.01); *G06F 3/0685* (2013.01); *G06N 3/08* (2013.01); *G06N 20/00* (2019.01)

(58) Field of Classification Search
CPC .... G06F 3/0647; G06F 3/0659; G06F 3/0685; G06F 3/0604; G06N 3/08; G06N 20/00
See application file for complete search history.

(56) References Cited

U.S. PATENT DOCUMENTS

| | | | | |
|---|---|---|---|---|
| 10,409,501 B1* | 9/2019 | Kushner | | G06F 3/0685 |
| 10,409,516 B1* | 9/2019 | Kushner | | G06F 3/0649 |
| 2015/0234719 A1* | 8/2015 | Coronado | | G06F 3/0683 |
| | | | | 714/6.3 |
| 2016/0189027 A1* | 6/2016 | Graves | | G06N 3/08 |
| | | | | 706/17 |
| 2017/0262216 A1* | 9/2017 | Polkovnikov | | G06F 3/067 |
| 2018/0018379 A1* | 1/2018 | Eda | | G06F 16/185 |
| 2018/0240010 A1* | 8/2018 | Faivishevsky | | G06N 3/0445 |
| 2018/0246659 A1* | 8/2018 | Agarwal | | G06F 3/0647 |
| 2018/0373722 A1* | 12/2018 | Ulasen | | G06N 3/08 |
| 2019/0114559 A1* | 4/2019 | Evans | | G06N 3/006 |
| 2020/0042234 A1* | 2/2020 | Krasner | | G06F 9/4856 |
| 2020/0125639 A1* | 4/2020 | Doyle | | G06F 40/205 |

* cited by examiner

*Primary Examiner* — Jing-Yih Shyu
(74) *Attorney, Agent, or Firm* — Chamberlain, Hrdlicka, White, Williams & Aughtry (57) ABSTRACT

A method and system for proactive data migration across tiered storage that uses machine learning is shown. The method includes receiving first input-output (IO) event metadata describing a first IO event, and analyzing the first IO event metadata using an optimized learning model (OLM), to obtain a first learning model output. The first learning model output is interpreted to generate a first data migration request, and the first data is proactively migrated from a first storage tier to a second storage tier based on the first data migration request.

18 Claims, 7 Drawing Sheets

METHOD AND SYSTEM FOR PROACTIVE DATA MIGRATION ACROSS TIERED STORAGE

BACKGROUND

Current data migration algorithms, employed across tiered storage, are predicated on weight sliding averages of activity for data extents in storage. This results in the classic problem of always 'chasing' the hot data, since proportional integral derivative (PID) control algorithms suffer from response latency. Any attempts to respond faster simply results in more false positive movements, and may in fact cause performance to decrease.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for proactive data migration across tiered storage. Specifically, one or more embodiments of the invention employs machine learning, directed to data prediction, to accurately estimate the likelihood that any given datum may be accessed at a discrete point in time, or window of time, of the near future. Given sufficiently high probabilities, the given datum may be proactively, rather than reactively, moved (as is the case with existing PID based solutions) between storage tiers to place the datum in an appropriate performance storage class.

Figure 1A:
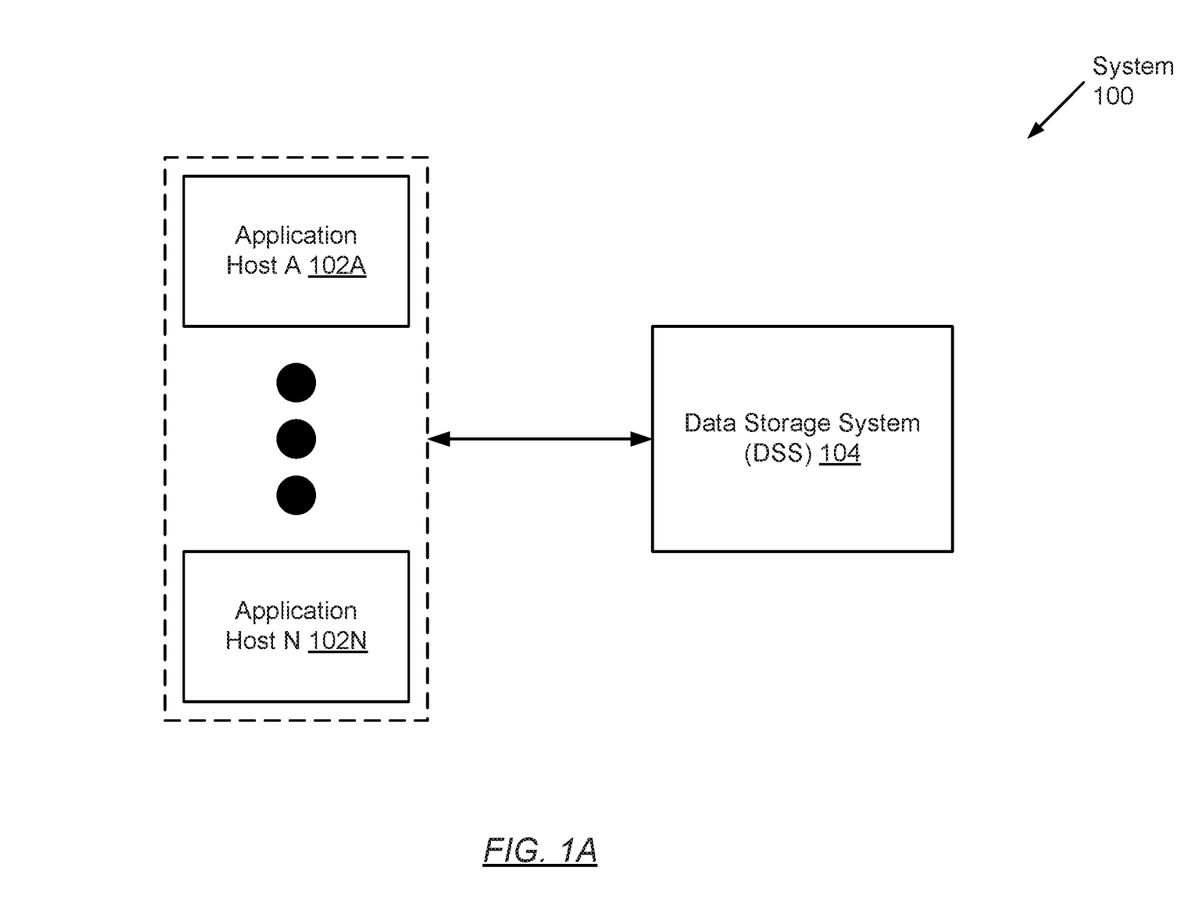
FIG. 1A shows a system in accordance with one or more embodiments of the invention.

FIG. 1A shows a system in accordance with one or more embodiments of the invention. The system (100) may include one or more application hosts (102A-102N) operatively connected to a data storage system (DSS) (104). Each of these system (100) components is described below.

In one embodiment of the invention, the aforementioned system (100) components may operatively connect to one another through a network (not shown) (e.g., a local area network (LAN), a wide area network (WAN) such as the Internet, a mobile network, etc.). The network may be implemented using any combination of wired and/or wireless connections. Further, the network may encompass various interconnected, network-enabled components (or systems) (e.g., switches, routers, gateways, etc.) that may facilitate communications between the aforementioned system (100) components. Moreover, the aforementioned system (100) components may communicate with one another using any combination of wired and/or wireless communication protocols.

In one embodiment of the invention, an application host (102A-102N) may represent any physical appliance or computing system designed and configured to receive, generate, process, store, and/or transmit data. Specifically, with respect to interacting with the DSS (104), an application host (102A-102N) may include functionality to submit input-output (IO) requests to the DSS (104), which may entail reading data from and/or writing data to the DSS (104). One of ordinary skill will appreciate that an application host (102A-102N) may perform other functionalities without departing from the scope of the invention. Examples of an application host (102A-102N) may include, but are not limited to, a desktop computer, a tablet computer, a laptop computer, a server, a mainframe, or any other computing system similar to the exemplary computing system shown in FIG. 5.

In one embodiment of the invention, the DSS (104) may represent an enterprise storage platform (e.g., a centralized repository for various forms of data). The DSS (104) may be implemented on one or more servers (not shown). Each server may be a physical server, residing in a datacenter, or a virtual server, which may alternatively reside in a cloud computing environment. Additionally or alternatively, the DSS (104) may be implemented using one or more computing systems similar to the exemplary computing system shown in FIG. 5. The DSS (104) is described in further detail below with respect to FIG. 1B.

While FIG. 1A shows a configuration of components, other system (100) configurations may be used without departing from the scope of the invention.

Figure 1B:
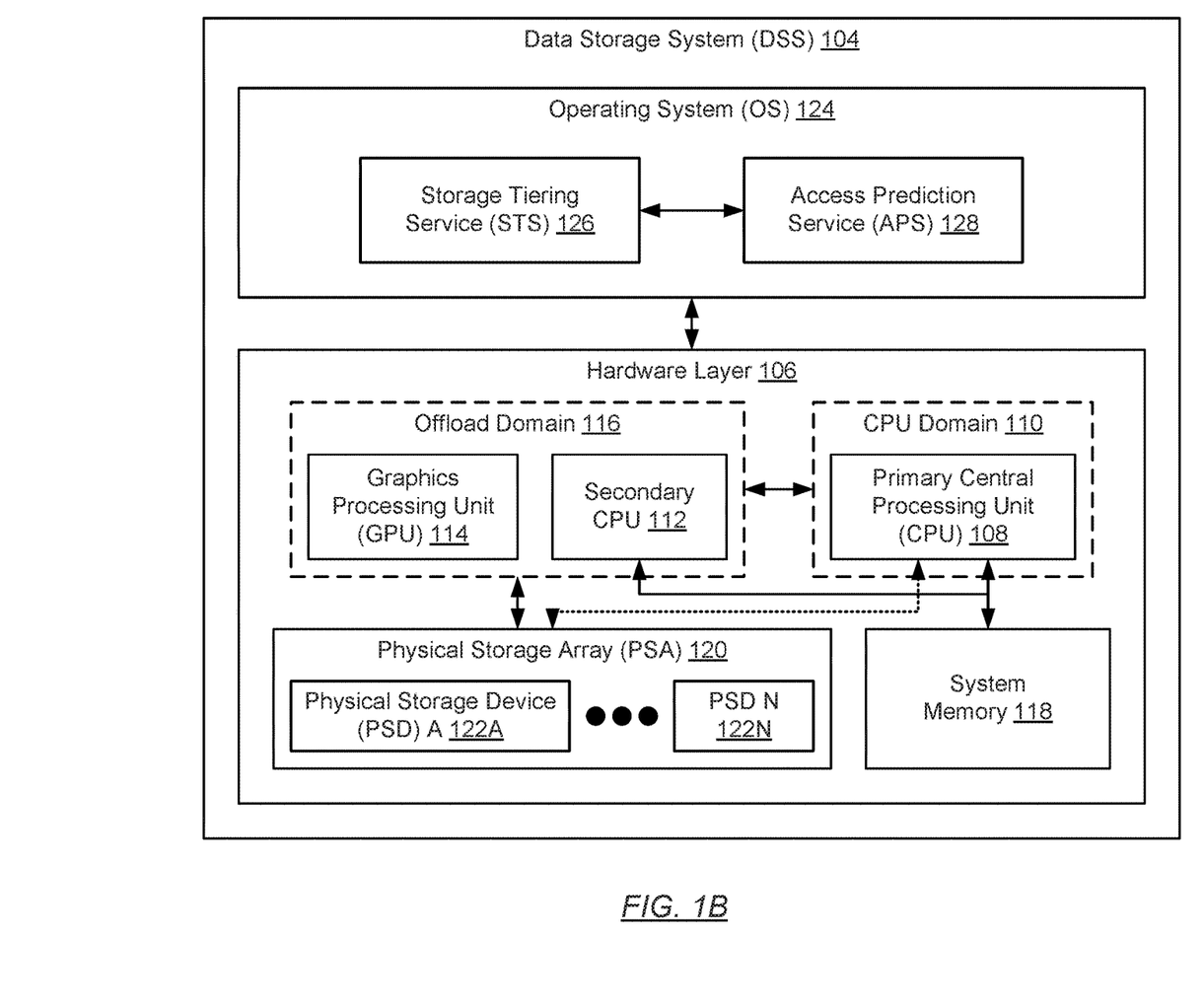
FIG. 1B shows a data storage system in accordance with one or more embodiments of the invention.

FIG. 1B shows a data storage system (DSS) in accordance with one or more embodiments of the invention. The DSS (104) may include a hardware layer (106) operatively connected to an operating system (OS) (124). Each of these DSS (104) components is described below.

In one embodiment of the invention, the hardware layer (106) may represent a portion of DSS (104) architecture that includes various physical and/or tangible components. Collectively, these various physical and/or tangible components may enable and provide the framework and resources on which at least the OS (124) may operate. Accordingly, the hardware layer (106) may include one or more central processing units (CPUs) (108, 112), one or more graphics processing units (GPUs) (114), system memory (118), and a physical storage array (PSA) (120). Each of these hardware layer (106) subcomponents is described below.

In one embodiment of the invention, a CPU (108, 112) may represent an integrated circuit designed and configured for processing instructions (e.g., computer readable program code). A CPU (108, 112) may encompass one or more cores, or micro-cores, which may be optimized to execute sequential or serial instructions at high clock speeds. Further, a CPU (108, 112) may be more versatile than a GPU (114) and, subsequently, may handle a diversity of functions, tasks, and/or activities. Towards processing instructions, the primary CPU (108) may, on occasion and for specific computational tasks, interact with the secondary CPU (112) and/or GPU (114).

In one embodiment of the invention, a GPU (114) may represent a specialized CPU (or integrated circuit) designed and configured to render graphics and/or perform specific computational tasks. In contrast to CPUs (108, 112), a GPU (114) may encompass hundreds or thousands of cores, or micro-cores, which may be optimized to execute parallel operations at slower clock speeds. Through their massively parallel architecture, a GPU (114) may be superior to a CPU (108, 112) in processing power, memory bandwidth, speed, and efficiency when executing tasks that predominantly require multiple parallel processes such as, for example, graphics rendering, machine learning, big data analysis, etc. In one embodiment of the invention, a GPU (114) may include dedicated GPU memory (not shown), which may refer to physical memory that may only be accessed by the GPU (114). Dedicated GPU memory may be implemented using any specialized volatile physical memory such as, for example, video random access memory (VRAM). VRAM may be similar to dynamic RAM (DRAM) with the exceptions of being faster than DRAM, and exhibiting the capability of being written to and read from simultaneously.

In one embodiment of the invention, hardware layer (106) design and/or architecture may partition system functions across one or more logical processing domains. These logical processing domains may include, but are not limited to, a CPU domain (110) and an offload domain (116). The CPU domain (110) may encompass the primary CPU (108), and may be responsible for implementing a vast majority of system functions. On the other hand, the offload domain (116) may encompass the secondary CPU (112) and/or GPU (114), and may be responsible for implementing few, often computing-intensive system functions. Accordingly, the offload domain (116) may exist to relieve the CPU domain (110) of any workloads that may bottleneck the CPU domain (110), and subsequently, impact the various system functions for which the CPU domain (110) may be responsible.

In one embodiment of the invention, system memory (118) may refer to physical memory that may store the instructions (e.g., computer readable program code) that which at least the primary CPU (108) executes. Further, system memory (118) may be implemented using volatile (e.g., DRAM, static RAM (SRAM), etc.) and/or non-volatile (e.g., read-only memory (ROM), etc.) physical memory.

In one embodiment of the invention, the PSA (120) may refer to a collection of one or more physical storage devices (PSD) (122A-122N) on which various forms of data—e.g., application data (not shown)—may be consolidated. Each PSD (122A-122N) may encompass non-transitory computer readable storage media on which data may be stored in whole or in part, and temporarily or permanently. Further, each PSD (122A-122N) may be implemented using a storage device technology. Examples of storage device technologies may include, but are not limited to, flash based storage devices, fibre channel (FC) based storage devices, serial-attached small computer system interface (SCSI) (SAS) based storage devices, and serial advanced technology attachment (SATA) storage devices. Moreover, in one embodiment of the invention, the PSA (120) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the OS (124) may refer to a computer program that executes over the hardware layer (106). The OS (124) may be responsible for managing the utilization of the hardware layer (106) by the various services (described below) executing on the DSS (104), as well as the by external entities operatively connected to the DSS (104) such as, for example, one or more application hosts (see e.g., FIG. 1A). Furthermore, the OS (124) may include functionality, but is not limited, to supporting fundamental DSS (104) functions, scheduling tasks, allocating and deallocating hardware layer (106) resources, executing or invoking one or more services, and controlling peripherals (if any). One of ordinary skill will appreciate that the OS (124) may perform other functionalities without departing from the scope of the invention.

In one embodiment of the invention, the OS (124) may include one or more services, each of which may implement one or more functionalities of the OS (124). Examples of these functionalities, including the handful mentioned above, may be directed, but not limited, to user interfacing, program execution, file system manipulation, input-output (IO) operations, communications, resource allocation, error detection, accounting, and security or protection. Of these services, a storage tiering service (STS) (126) and an access prediction service (APS) (128) may be included. Each of these OS (124) services is described below.

In one embodiment of the invention, the STS (126) may refer to a computer program or process (i.e., an instance of a computer program) that executes over the hardware layer (106). Further, the STS (126) may be responsible for configuring a tiered storage architecture (described below) (see e.g., FIG. 2), entailing at least a portion of the PSA (120), based on datacenter administrator instructions and/or preferences. One of ordinary skill will appreciate that the STS (126) may perform other functionalities without departing from the scope of the invention.

In one embodiment of the invention, the APS (128) may refer to a computer program or process (i.e., an instance of a computer program) that executes over the hardware layer (106). Further, the APS (128) may be responsible for predicting which data, stored on at least a portion of the PSA (120), shall be accessed (or needed) in the future based, at least in part, on observed historical data access patterns. To that extent, the APS (128) may include functionality to optimize and employ learning models (described below) (see e.g., FIGS. 3 and 4) to derive probabilities directed to which data may most likely be accessed in the future by one or more application hosts (see e.g., FIG. 1A). The APS (128) is described in further detail below with respect to FIG. 1C.

While FIG. 1B shows a configuration of components, other DSS (104) configurations may be used without departing from the scope of the invention.

Figure 1C:
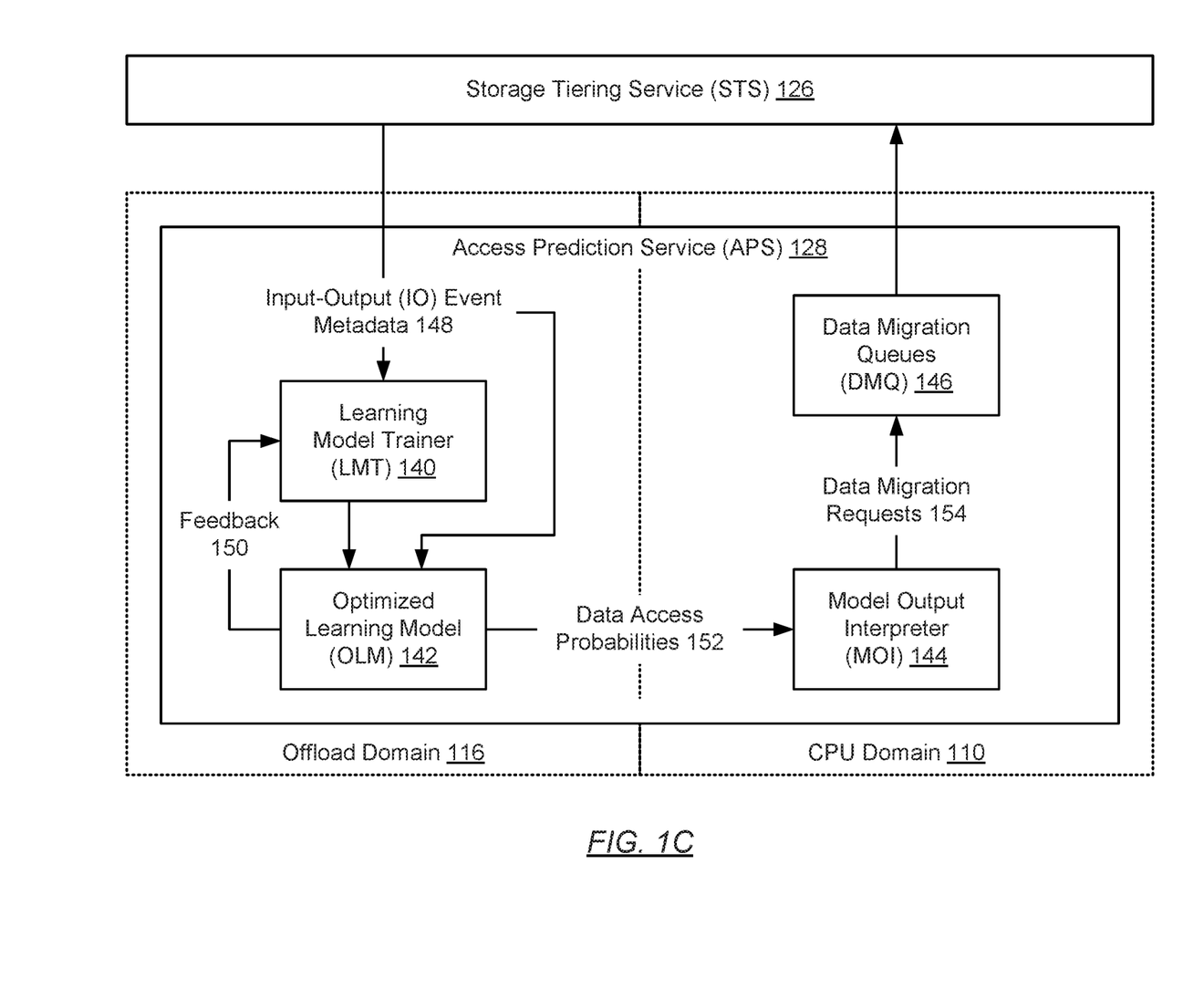
FIG. 1C shows an access prediction service in accordance with one or more embodiments of the invention.

FIG. 1C shows an access prediction service (APS) in accordance with one or more embodiments of the invention. The APS (128) may include various components—a subset of which may execute on the offload domain (116), while another subset may execute on the CPU domain (110). The more compute-intensive APS (128) components, which may execute on the offload domain (116), may include a learning model trainer (LMT) (140) and an optimized learning model (OLM) (142). Accordingly, the less compute-intensive APS (128) components, which may alternatively execute on the CPU domain (110), may include a model output interpreter (MOI) (144) and one or more data migration queues (DMQ) (146). Each of these APS (128) components is described below.

In one embodiment of the invention, the LMT (140) may refer to a computer program or process (i.e., an instance of a computer program) that executes over the hardware layer (106) (see e.g., FIG. 1B). Further, the LMT (140) may be designed and configured to optimize (i.e., train) one or more learning models. A learning model may generally refer to a machine learning paradigm or algorithm (e.g., a neural network, a decision tree, a support vector machine, a linear regression model, etc.) that may be used in data classification, data prediction, and other forms of data analysis. To that extent, the LMT (140) may include functionality to: aggregate input-output (IO) event metadata (148) (described below); partition aggregated IO event metadata into learning model training and validation sets; train the learning model(s) using the training sets, to derive optimal learning model parameters (described below); validate the learning model(s) using the validation sets, to derive optimal learning model hyper-parameters (described below); and configure or adjust the OLM (142) using the derived optimal learning model parameters and hyper-parameters. The IO event metadata (148) may be aggregated or received from the STS (126), or process(es) executing therein, that may be responsible for handling (and examining) IO events directed thereto by one or more application hosts (102A-102N). One of ordinary skill will appreciate that the LMT (140) may perform other functionalities without departing from the scope of the invention.

In one embodiment of the invention, the OLM (142) may refer to a computer program or process (i.e., an instance of a computer program) that executes over the hardware layer (106). Further, the OLM (142) may be designed and configured to implement a machine learning algorithm, which has been optimized through supervised or unsupervised learning (described below). The objective of the OLM (142) may be directed to estimating, within a high accuracy, data access probabilities (152), based on various optimized configuration variables (i.e., optimal learning model parameters and hyper-parameters (described above)), and from a given input data set (e.g., IO event metadata (148)). A data access probability (152) may refer to a numerical value that estimates the likelihood that a given data, at least associated with an inputted, given IO event metadata (148), will be accessed by an application host in the near future. The OLM (142) may also include functionality to derive feedback data (150) from false-positive learning model outputs (i.e., data access probabilities (152)) and, subsequently, provide the feedback data (150) back to the LMT (140) to be used in future training phases. By incorporating feedback data (150) in the training phases, the learning model may attain the capability to adapt and overcome from its mistakes. In one embodiment of the invention, because of the feedback data (150) fed back to the LMT (140), the OLM (142) and/or learning model employed may be acknowledged as a recurrent learning machine algorithm (e.g., a recurrent neural network (RNN)). One of ordinary skill will appreciate that the OLM (142) may perform other functionalities without departing from the scope of the invention.

In one embodiment of the invention, the MOI (144) may refer to a computer program or process (i.e., an instance of a computer program) that executes over the hardware layer (106). Further, the MOI (144) may be designed and configured to interpret learning model outputs (i.e., data access probabilities (152)) (see e.g., FIG. 4). The MOI (144) may interpret learning model outputs based on learning model output thresholds, which may be used to determine whether data migration requests (154) should be generated and queued in a DMQ (146). A data migration request (154) may refer to a service request directed to migrating certain data from one storage tier to another. The request may include, but is not limited to, a unique data identifier associated with the certain data, a source storage tier where the certain data may currently be stored (e.g., pre-migration), and a destination storage tier where the certain data should reside (e.g., post-migration). Moreover, whether data migration requests (154) are generated may also be contingent on migration cost metrics (not shown). A migration cost metric may refer to an estimation of a length of time that may elapse to complete the proactive data migration. One of ordinary skill will appreciate that the MOI (144) may perform other functionalities without departing from the scope of the invention.

In one embodiment of the invention, a DMQ (146) may refer to a first-in, first out (FIFO) buffer that enables data migration requests (154) to be queued and, accordingly, await retrieval and processing from/by the STS (126), or process(es) therein. A DMQ (146) may be implemented using physical memory storage (e.g., random access memory (RAM)), which permits any queued data migration requests (154) to be stored temporarily.

While FIG. 1C shows a configuration of components, other APS (128) configurations may be used without departing from the scope of the invention. For example, in one embodiment of the invention, the APS (128) may exclude the DMQ (146), wherein the responsibility of processing and performing the proactive data migrations, based the interpreted data access probabilities (152), may fall to the MOI (144)—rather than the STS (126).

Figure 2:
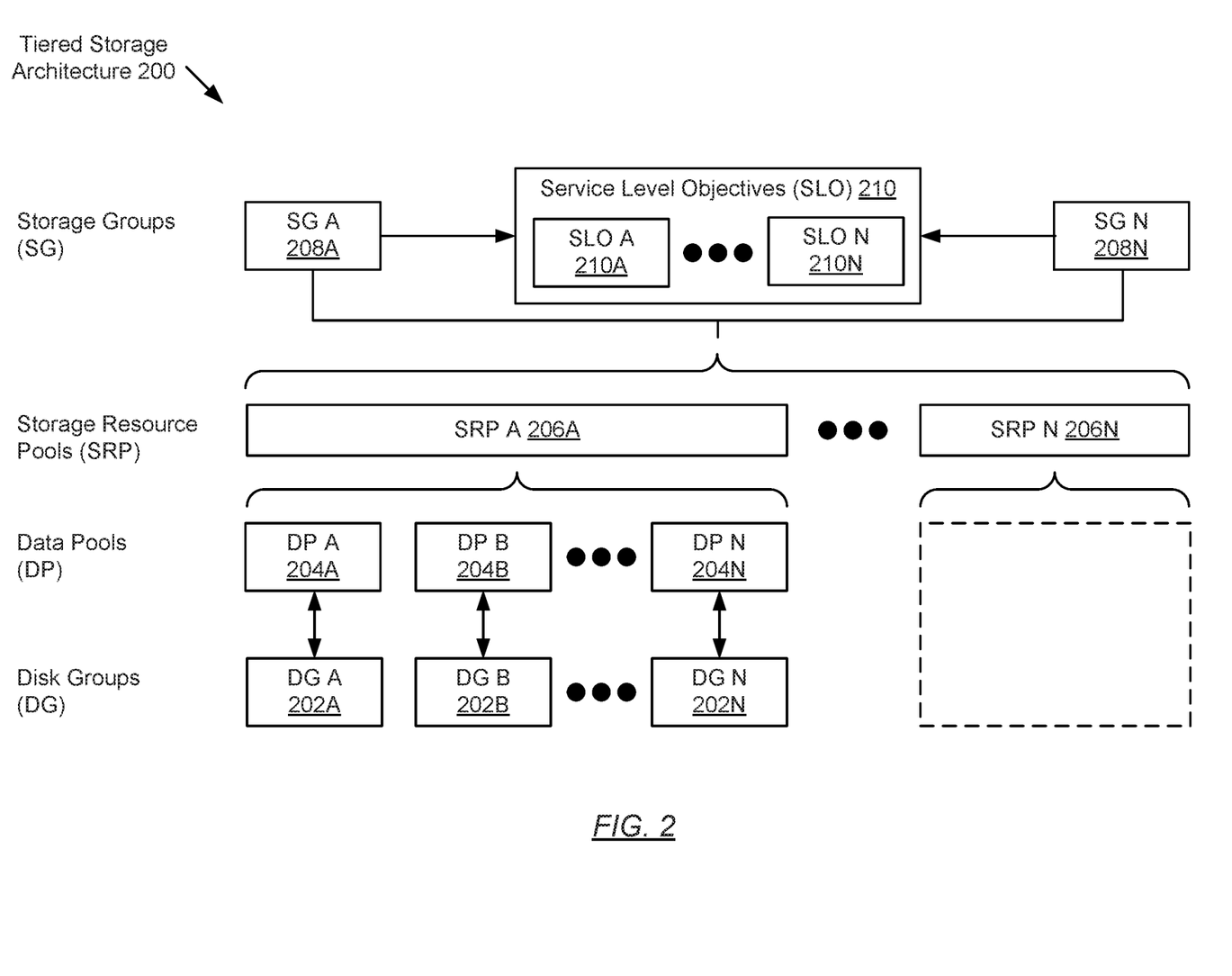
FIG. 2 shows a tiered storage architecture in accordance with one or more embodiments of the invention.

FIG. 2 shows a tiered storage architecture in accordance with one or more embodiments of the invention. The tiered storage architecture (200) may represent an exemplary framework for the tiering of data storage based on a set of service level objectives (SLO) (210) (described below). The tiered storage architecture (200) may include one or more disk groups (DG) (202A-202N), one or more data pools (DP) (204A-204N), one or more storage resource pools (SRP) (206A-206N), one or more storage groups (SG)

(208A-208N), and one or more SLOs (210A-210N). Each of these tiered storage architecture (200) components is described below.

In one embodiment of the invention, a disk group (DG) (202A-202N) may refer to a collection of physical storage devices (PSDs) (see e.g., FIG. 1B) that share the same physical and performance characteristics. By way of examples, one or more PSDs may be grouped to form a DG (202A-202N) based on any subset or all of the following attributes: storage device technology (e.g., flash based storage devices, fibre channel (FC) based storage devices, serial-attached small computer system interface (SCSI) (SAS) based storage devices, or serial advanced technology attachment (SATA) storage devices); storage capacity (e.g., in bytes); form factor; rotational speed (e.g., in revolutions per minute (RPM)); and desired redundant array of independent disks (RAID) protection type (e.g., RAID1, RAID5, RAID6, or unprotected).

In one embodiment of the invention, upon creating a given DG (202A-202N), the given DG (202A-202N) may automatically be configured with one or more data devices (not shown). The cardinality (i.e., number) of data devices automatically configured for the given DG (202A-202N) may match the cardinality of PSDs grouped in the given DG (202A-202N). Further, a data device may represent an internal logical device, which may provide the physical storage backing a corresponding virtually provisioned device (described below). In one embodiment of the invention, a data pool (DP) (204A-204N) may refer to a collection of data devices that share the same emulation (e.g., fixed block architecture (FBA), count-key data (CKD), etc.) and RAID protection type.

In one embodiment of the invention, a storage resource pool (SRP) (206A-206N) may refer to a collection of DP (204A-204N), which may define a data migration domain. That is, any migration of data (stored, physically, in the DG(s) (202A-202N), across storage tiers, must be performed within the bounds of a given SRP (206A-206N) in which the DG(s) (202A-202N) reside.

Moreover, in one embodiment of the invention, a storage group (SG) (208A-208N) may refer to a logical collection of one or more virtually provisioned devices that may be managed together. A virtually provisioned device may refer to a host (e.g., application host (see e.g., FIG. 1A)) accessible device to which the host may direct storage device IO requests. As mentioned above, the physical storage that may back the storage capacity, consumed by a given virtually provisioned device, may be allocated from a data device in a DP (204A-204N). Furthermore, when a storage device IO request pertains to writing data to a portion of a virtually provisioned device, physical storage from the data device may be allocated and mapped to a region of the virtually provisioned device, which may include the area targeted by the write operation. On the other hand, when a storage device IO request pertains to reading data from a portion of a virtually provisioned device, the data sought by the read operation may be retrieved from the physical storage of a corresponding data device into which the sought data had been written. Moreover, any given SG (208A-208N) may be associated with a SRP (206A-206N), a SLO (210A-210N), or a combination thereof.

In one embodiment of the invention, a SLO (210A-210N) may refer to an expected average response time goal for one or more applications (residing on one or more application hosts (see e.g., FIG. 1A)), which may access data on the data storage system (DSS). Examples of expected average response times, which may reflect the performance attained through the employment of flash based storage devices (e.g., high-performance storage devices) to SATA based storage devices (e.g., low-performance storage devices), may range from 0.8 milliseconds to 14 milliseconds, respectively.

In one embodiment of the invention, a storage tier (not shown) may refer to a collection of PSDs that share the same storage device technology and RAID protection type. By way of examples, a storage tier may encompass: one or more flash based storage devices and a selected RAID protection type, which may be used as high-performance storage characterized by low response times and high costs per unit storage capacity; one or more FC based storage devices and a selected RAID protection type, which may be used as medium-performance storage characterized by medium response times and medium costs per unit storage capacity; one or more SAS based storage devices and a selected RAID protection type, which may be used as medium-performance storage characterized by medium response times and medium costs per unit storage capacity; and one or more SATA based storage devices and a selected RAID protection type, which may be used as low-performance storage characterized by high response times and low cost per unit storage capacity.

In one embodiment of the invention, a tiered storage policy (not shown) may refer to a policy that manages data placement and migration across storage tiers to achieve SLOs (210A-210N) for one or more SG (208A-208N). Each tiered storage policy may subsequently group one or more storage tiers, and specify upper usage limits for each storage tier. The upper usage tier assigned to a given storage tier may reflect a percentage of the total storage capacity, of a SG (208A-208N) associated with the tiered storage policy, that can be reside on the given storage tier. The percentage of storage capacity for each storage tier specified in a tiered storage policy, when combined, must total one-hundred percent. Moreover, a tiered storage policy may be applied to multiple SG (208A-208N), however, any given SG (208A-208N) may only be associated with one tiered storage policy.

Figure 3:
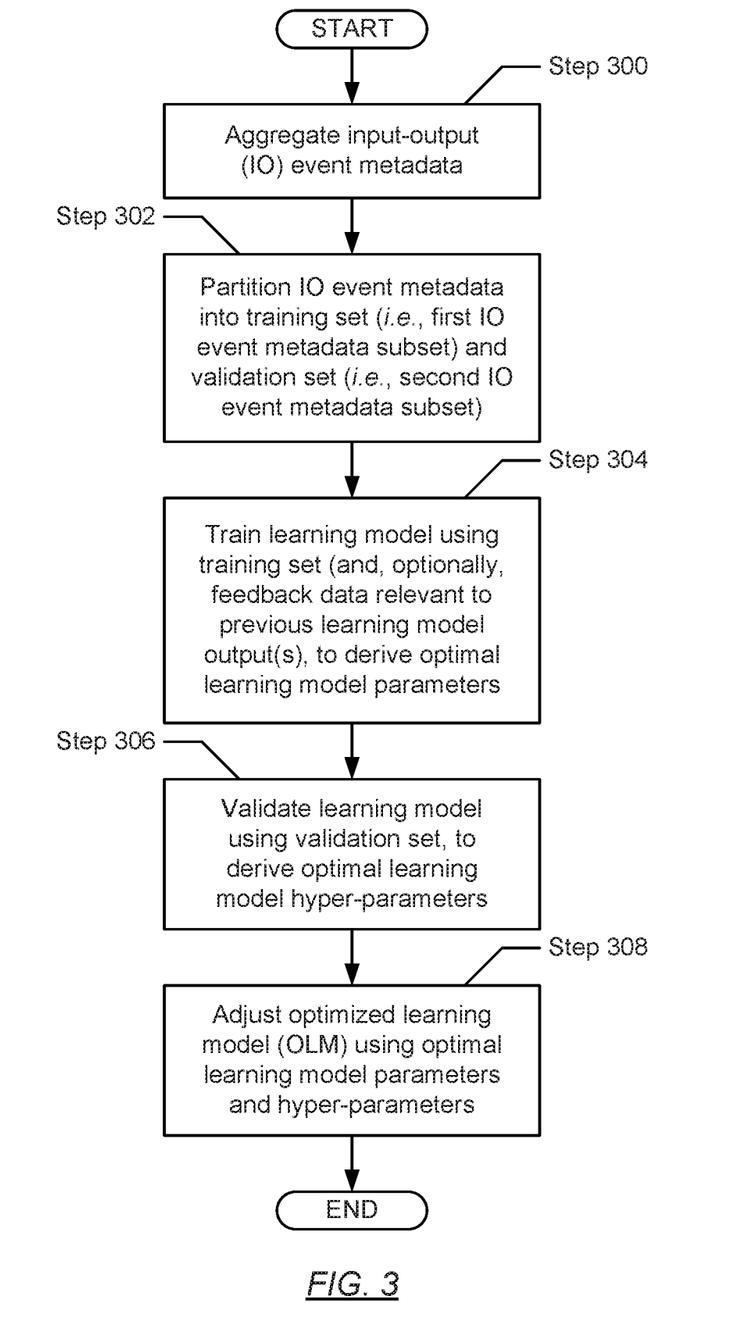
FIG. 3 shows a flowchart describing a method for adjusting an optimized learning model in accordance with one or more embodiments of the invention.

FIG. 3 shows a flowchart describing a method for adjusting an optimized learning model in accordance with one or more embodiments of the invention. The various steps outlined below may be performed by the access prediction service (APS) executing on the data storage system (DSS) (see e.g., FIGS. 1B and 1C). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, input-output (IO) event metadata is aggregated. In one embodiment of the invention, IO event metadata may refer to information that describes one or more IO events. An IO event may refer to a storage device (e.g., disk) IO request, which may have been submitted to the DSS by an application host (see e.g., FIG. 1A). The storage device IO request may be directed to reading data from a physical storage array (PSA) of the DSS or, alternatively, may be directed to writing data to the PSA. Further, the aggregated IO event metadata may include historical (i.e., previously observed or received) 10 event metadata describing one or more historical IO events. Examples of IO event metadata may include, but is not limited to, observed IO per seconds (IOPS), read percentages, read IO sizes, write IO sizes, and IO response times.

In Step 302, the IO event metadata (aggregated in Step 300) is partitioned into two IO event metadata subsets. In one embodiment of the invention, a first IO event metadata subset may be designated as a training set, whereas a second IO event metadata subset may alternatively be designated as a validation set.

In Step 304, a learning model is trained using the training set (i.e., first IO event metadata subset) (obtained in Step 302). In one embodiment of the invention, training of the learning model may entail: initializing a set of learning model parameters that, at least in part, define the learning model; and adjusting these aforementioned learning model parameters through various iterations of supervised or unsupervised learning, until a goal training accuracy (or another metric) is reached. Supervised learning may refer to the learning of inferences from labeled training sets, while unsupervised learning may alternatively refer to the learning of inferences from unlabeled training sets. A labeled training set may refer to a training set that includes input data and a target or desired output that is sought to be obtained from processing the input data. An unlabeled training set, on the other hand, may refer to a training set that only includes input data.

In one embodiment of the invention, the above-mentioned learning model may refer to a machine learning paradigm (or algorithm) that may be directed to prediction or forecasting. More specifically, the objective of the learning model may pertain to predicting which data, stored in the DSS, may most likely be accessed within a discrete time or a window of time in the future. Examples of machine learning paradigms or algorithms may include, but are not limited to, neural networks, decision trees, support vector machines, linear regression models, clustering, etc. Furthermore, the above-mentioned learning model parameters may vary depending on an architecture of the learning model. Generally, a learning model parameter may represent an internal learning model configuration variable, which may be optimized from the processing of data during training of the learning model. By way of an example, if the learning model follows a neural network design, the associated learning model parameters may include, but are not limited to, a number of layers residing between the model input and the model output, a number of nodes occupying each layer, an interconnectivity configuration between the various nodes, values of weights representative of the strengths of the various inter-nodal connections, and propagation functions through which nodal outputs are computed with respect to nodal inputs and/or other parameters (e.g., weights).

In one embodiment of the invention, training of the learning model may also incorporate feedback data derived from previous learning model outputs (described below) (see e.g., FIG. 4). That is, the learning model may include functionality to adapt (or correct itself) by learning from any mistakes. Mistakes (or the feedback data) may encompass real-time prediction runs, where analysis of any real-time IO event metadata results in a false-positive learning model output. A false-positive learning model output may reference a learning model output that predicts certain data will be accessed in the future, when in actuality, it is not.

In Step 306, the learning model is subsequently validated using the validation set (i.e., second IO event metadata subset) (obtained in Step 302). In one embodiment of the invention, validation of the learning model may entail: initializing a set of learning model hyper-parameters that, at least in part, define the learning model; and adjusting these aforementioned learning model hyper-parameters through various iterations of supervised or unsupervised learning, until a goal validation accuracy (or another metric) is reached. Generally, a learning model hyper-parameter may represent an external learning model configuration variable, which cannot be optimized through the processing of data. Further, a learning model hyper-parameter may influence how the learning model parameter(s) may be optimized. Like learning model parameters, learning model hyper-parameters may vary depending on an architecture of the learning model. By way of an example, if the learning model follows a neural network design, the associated learning model hyper-parameters may include, but are not limited to, a learning rate for training the neural network, a specificity of a learning rule for governing how the learning model parameter(s) may be adjusted to produce desired training results, a number of epochs (or iterations) the training of the learning model should elapse, etc.

In Step 308, an optimized learning model (OLM) may be adjusted or configured using the optimal learning model parameters (derived in Step 304) and hyper-parameters (derived in Step 306). Specifically, in one embodiment of the invention, if the OLM is representative of a first OLM version, then the finalized learning model (obtained as a result of reaching the goal validation accuracy in Step 306) may become the OLM. In another embodiment of the invention, if the OLM is alternatively representative of a subsequent (i.e., non-first) OLM version, then a previous OLM version may be updated, using the optimal learning model parameters and hyper-parameters, to arrive at an adjusted or updated OLM. Furthermore, updating a previous OLM version may entail replacing a previously optimal set of learning model parameters and hyper-parameters with the recently derived optimal learning model parameters and hyper-parameters.

Figure 4:
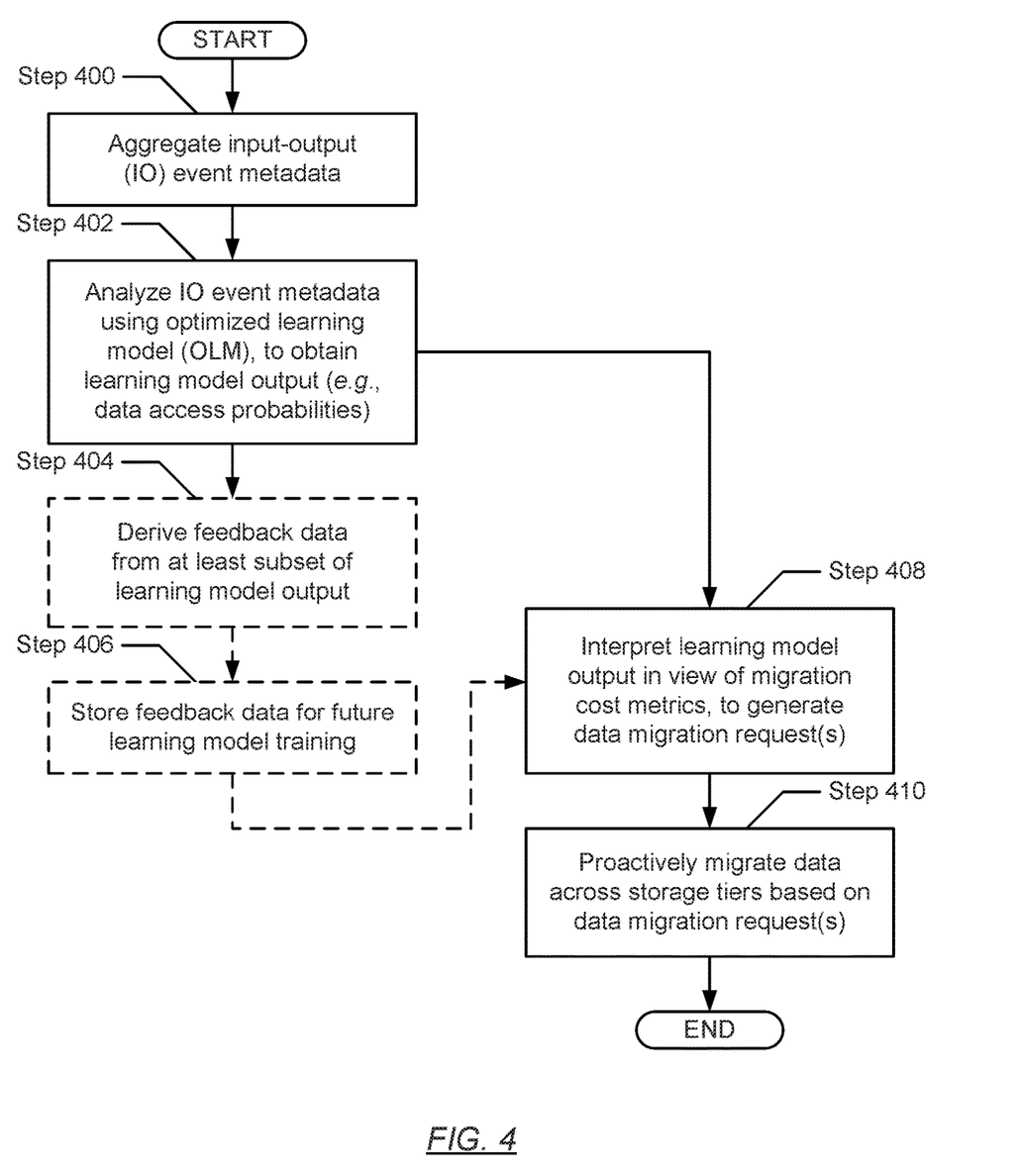
FIG. 4 shows a flowchart describing a method for proactively migrating data across storage tiers in accordance with one or more embodiments of the invention.

FIG. 4 shows a flowchart describing a method for proactively migrating data across storage tiers in accordance with one or more embodiments of the invention. The various steps outlined below may be performed by the access prediction service (APS) executing on the data storage system (DSS) (see e.g., FIGS. 1B and 1C). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, input-output (IO) event metadata is aggregated (or received). In one embodiment of the invention, IO event metadata may refer to information that describes one or more IO events. An IO event may refer to a storage device (e.g., disk) IO request, which may have been submitted to the DSS by an application host (see e.g., FIG. 1A). The storage device IO request may be directed to reading data from a physical storage array (PSA) of the DSS or, alternatively, may be directed to writing data to the PSA. Further, the aggregated IO event metadata may include real-time IO event metadata describing a recently received/observed IO event. Examples of IO event metadata may include, but is not limited to, observed IO per seconds (IOPS), read percentages, read IO sizes, write IO sizes, and IO response times.

In Step 402, the IO event metadata (aggregated in Step 400) is analyzed using an optimized learning model (OLM). In one embodiment of the invention, the OLM may refer to a machine learning paradigm (or algorithm) that may be directed to prediction or forecasting. More specifically, the objective of the OLM may pertain to predicting which data, stored in the DSS, may most likely be accessed within a discrete time or a window of time in the future. Examples of machine learning paradigms or algorithms may include, but are not limited to, neural networks, decision trees, support vector machines, linear regression models, clustering, etc. Further, the OLM may represent a learning model (described above) that exhibits optimal learning model parameters and hyper-parameters, which may have been optimized through iterative supervised or unsupervised learning.

In one embodiment of the invention, analysis of the above-mentioned IO event metadata, using the OLM, may result in an obtaining of a learning model output. A learning model output may refer to data produced by the OLM based on a configuration of the OLM (i.e., defined through optimal learning model parameters and hyper-parameters) and a given input data (e.g., the IO event metadata). In one embodiment of the invention, the learning model output may include the estimation of one or more data access probabilities. Each data access probability may refer to a numerical value that estimates a likelihood that a given data, relevant to at least a portion of the IO event metadata (aggregated in Step 400), will be accessed by an application host (see e.g., FIG. 1A) at some point in time in the near future.

Hereinafter, in one embodiment of the invention, the process may proceed along a first path that includes Steps 404 and 406. The process may take this first path if learning model training (see e.g., FIG. 3) incorporates feedback data (described below). In another embodiment of the invention, the process may alternatively proceed along a second path that excludes Steps 404 and 406. The process may alternatively take this second path if learning model training does not incorporate feedback data.

In Step 404, feedback data is derived from at least a subset of the learning model output (produced in Step 402). In one embodiment of the invention, feedback data may refer to a false-positive learning model output (should any be produced based on received, real-time IO event metadata. A false-positive learning model output may reference a learning model output that predicts certain data will be accessed in the near future, when in actuality, it is not. Further, feedback data may serve to allow a learning model to adapt and overcome these false-positive learning model output(s). Thereafter, in Step 406, the feedback data (derived in Step 404) is stored. Specifically, in one embodiment of the invention, the feedback data may be stored until retrieved and incorporated into a future training phase of the learning model.

In Step 408, the learning model output (produced in Step 402) is interpreted. In one embodiment of the invention, interpretation of the learning model output (i.e., a data access probability) may entail, for example, comparing the learning model output against a learning model output threshold (i.e., a data access probability threshold—e.g., the numerical value 0.9 representative of a 90% (or very high) likelihood that certain data will be accessed in the near future); and making a determination, based on the comparison, as to whether the learning model output falls short of, or meets/exceeds, the learning model output threshold. Accordingly, in one embodiment of the invention, should the former case (i.e., learning model output falls below the learning model output threshold) result, then the proactive migration of the data across storage tiers may not transpire because the measure of confidence (or probability) is not a minimum required to trigger the data migration. In another embodiment of the invention, should the latter case (i.e., learning model output meets or exceeds the learning model output threshold) result, then the proactive migration of the data across storage tiers would take place because the measure of confidence (or probability) is sufficiently high.

In one embodiment of the invention, when the learning model output meets or exceeds a learning model output threshold, the generation of one or more data migration requests may follow. A data migration request may refer to a service request directed to migrating certain data from one storage tier to another. The request may include, but is not limited to, a unique data identifier associated with the certain data, a source storage tier where the certain data may currently be stored (e.g., pre-migration), and a destination storage tier where the certain data should reside (e.g., post-migration).

In one embodiment of the invention, interpretation of the learning model output, to determine whether a data migration request is to be generated, may further rely on a migration cost metric. A migration cost metric may refer to an estimation of a length of time that may elapse to complete the proactive data migration. This migration cost metric may, in turn, be compared against historically observed lengths of time, reflecting data access time, for accessing the certain data. Further, based on the migration cost metric (i.e., estimated data migration time) exceeding the data access time, migration of the certain data may be aborted. Alternatively, based on the migration cost metric exhibiting a value below the data access time, migration of the certain data may proceed.

In Step 410, the certain data, for which at least a portion of the IO event metadata (aggregated in Step 400) is associated, is subsequently migrated across one storage tier to another. In one embodiment of the invention, the migration may entail servicing the data migration request(s) (generated in Step 408) in order to migrate the certain data from a low-performance storage tier to a high-performance storage tier. In another embodiment of the invention, the data migration request(s) may be serviced to, alternatively, migrate the certain data from a high-performance storage tier to a low-performance storage tier.

Figure 5:
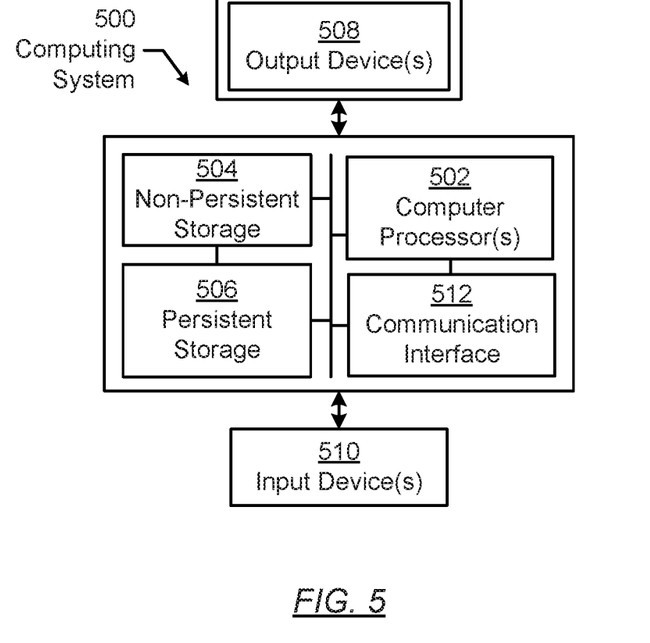
FIG. 5 shows a computing system in accordance with one or more embodiments of the invention.

FIG. 5 shows a computing system in accordance with one or more embodiments of the invention. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a central processing unit (CPU) and/or a graphics processing unit (GPU). The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for proactive data migration across tiered storage, comprising:
    receiving first input-output (IO) event metadata describing a first IO event;
    analyzing the first IO event metadata using an optimized learning model (OLM), to obtain a first learning model output;
    interpreting the first learning model output, to generate a first data migration request; and
    migrating, proactively, first data from a first storage tier to a second storage tier based on the first data migration request;
    aggregating a set of historical IO event metadata describing, respectively, a set of historical IO events;
    partitioning the set of historical IO event metadata, to at least obtain a training set comprising a first historical IO event metadata subset;
    training a learning model using the training set, to derive optimal learning model parameters; and
    adjusting the OLM using at least the optimal learning model parameters, to obtain an adjusted OLM.

2. The method of claim 1, wherein the IO event metadata comprises observed IO per seconds (IOPS), read percentages, read IO sizes, write IO sizes, and IO response times.

3. The method of claim 1, wherein the OLM is a recurrent neural network (RNN).

4. The method of claim 1, wherein the first learning model output comprises a set of data access probabilities for a data set.

5. The method of claim 1, wherein generating the first data migration request may be performed based on a migration cost metric.

6. The method of claim 5, wherein the migration cost metric comprises an estimate for time needed to complete migration of the first data from the first storage tier to the second storage tier.

7. The method of claim 1, wherein the set of historical IO event metadata comprises the first IO event metadata, wherein the set of historical IO events comprises the first IO event.

8. The method of claim 1, wherein training the learning model further uses feedback data derived from the first learning model output, to derive the optimal learning model parameters.

9. The method of claim 1, further comprising:
    partitioning the set of historical IO event metadata, to further obtain a validation set comprising a second historical IO event metadata subset;
    validating the learning model using the validation set, to derive optimal learning model hyper-parameters; and
    adjusting the OLM further using the optimal learning model hyper-parameters, to obtain the adjusted OLM.

10. The method of claim 9, further comprising:
    receiving second IO event metadata describing a second IO event;
    analyzing the second IO event metadata using the adjusted OLM, to obtain a second learning model output;
    interpreting the second learning model output, to generate a second data migration request; and
    migrating, proactively, second data from a third storage tier to a fourth storage tier based on the second data migration request.

11. The method of claim 1, further comprising:
    receiving second IO event metadata describing a second IO event;
    analyzing the second IO event metadata using the OLM, to obtain a second learning model output;
    interpreting the second learning model output, to generate a second data migration request; and
    migrating, proactively, second data from a third storage tier to a fourth storage tier based on the second data migration request.

12. A data storage system (DSS), comprising:
    an offload domain comprising a first computer processor;
    an access prediction service (APS), at least in part, executing on the first computer processor, and programmed to:
        receive input-output (IO) event metadata describing an IO event; and
        analyze the IO event metadata using an optimized learning model (OLM), to obtain a learning model output;
    a central processing unit (CPU) domain operatively connected to the offload domain, and comprising a second computer processor,
    wherein the APS further executes, at least in part, on the second computer processor, and is further programmed to:
        interpret the learning model output, to generate a data migration request; and
        migrate, proactively, data from a first storage tier to a second storage tier based on the data migration request;
        aggregating a set of historical IO event metadata describing, respectively, a set of historical IO events;
        partitioning the set of historical IO event metadata, to at least obtain a training set comprising a first historical IO event metadata subset;
        training a learning model using the training set, to derive optimal learning model parameters; and
        adjusting the OLM using at least the optimal learning model parameters, to obtain an adjusted OLM.

13. The DSS of claim 12, wherein the first computer processor is one selected from a group consisting of a secondary central processing unit (CPU) and a graphics processing unit (GPU).

14. The DSS of claim 12, wherein the second computer processor is a primary CPU.

15. The DSS of claim 12, further comprising:
a physical storage array (PSA) operatively connected to the offload domain and the CPU domain, and comprising a plurality of physical storage devices (PSDs),
wherein the first storage tier comprises a first subset of the plurality of PSDs,
wherein the second storage tier comprises a second subset of the plurality of PSDs.

16. The DSS of claim 15, wherein the first subset of the plurality of PSDs comprises high-performance data storage, wherein the second subset of the plurality of PSDs comprises low-performance data storage.

17. The DSS of claim 15, wherein the first subset of the plurality of PSDs comprises low-performance data storage, wherein the second subset of the plurality of PSDs comprises high-performance data storage.

18. A non-transitory computer readable medium (CRM) comprising computer readable program code, which when executed by a computer processor, enables the computer processor to:
receive input-output (IO) event metadata describing an IO event;
analyze the IO event metadata using an optimized learning model (OLM), to obtain a learning model output;
interpret the learning model output, to generate a data migration request; and
migrate, proactively, data from a first storage tier to a second storage tier based on the data migration request;
aggregating a set of historical IO event metadata describing, respectively, a set of historical IO events;
partitioning the set of historical IO event metadata, to at least obtain a training set comprising a first historical IO event metadata subset;
training a learning model using the training set, to derive optimal learning model parameters; and
adjusting the OLM using at least the optimal learning model parameters, to obtain an adjusted OLM.

* * * * *